United States Patent [19]

Struttmann et al.

[11] Patent Number: 4,489,475
[45] Date of Patent: Dec. 25, 1984

[54] METHOD OF CONSTRUCTING A DRIVE TENSIONING DEVICE

[75] Inventors: Hilarious S. Struttmann; Kenneth R. Donahue; Paul W. Cooper, all of Maysville, Ky.

[73] Assignee: Emerson Electric Co., St. Louis, Mo.

[21] Appl. No.: 392,804

[22] Filed: Jun. 28, 1982

[51] Int. Cl.³ .............................................. B23P 19/00
[52] U.S. Cl. ................................... 29/526 R; 72/377; 403/84; 403/110; 474/133
[58] Field of Search .................. 29/526 R, 159.2, 521; 72/377, 379; 474/133, 101; 403/84, 110

[56] References Cited

U.S. PATENT DOCUMENTS

| | | | |
|---|---|---|---|
| 659,522 | 10/1900 | Furbish | 29/159.2 UX |
| 1,301,475 | 4/1919 | Mellin | 403/84 X |
| 1,454,508 | 5/1923 | Eckert | 29/159.2 X |
| 1,627,901 | 5/1927 | Hills | 403/110 X |
| 2,226,819 | 12/1940 | Jeffries | 29/526 R |
| 2,318,950 | 5/1943 | Larmour | 29/521 UX |
| 2,975,312 | 3/1961 | Ploran | 29/521 X |
| 3,071,980 | 1/1963 | Brewer | 474/133 |
| 3,348,300 | 10/1967 | Lindgren | 29/521 X |
| 4,380,860 | 4/1983 | Riester et al. | 72/377 X |

*Primary Examiner*—Charlie T. Moon
*Attorney, Agent, or Firm*—Charles E. Markham

[57] ABSTRACT

Meshing radially serrated annular pads projecting from the meeting surfaces of two members of a belt drive tensioning device to provide locked incremental angular adjustment of the members are formed by depressing an annular indentation in each member in the side thereof opposite its meeting side so as to cold flow metal to the meeting side thereof and in coining a serrated annulus in the metal thus transferred.

1 Claim, 10 Drawing Figures

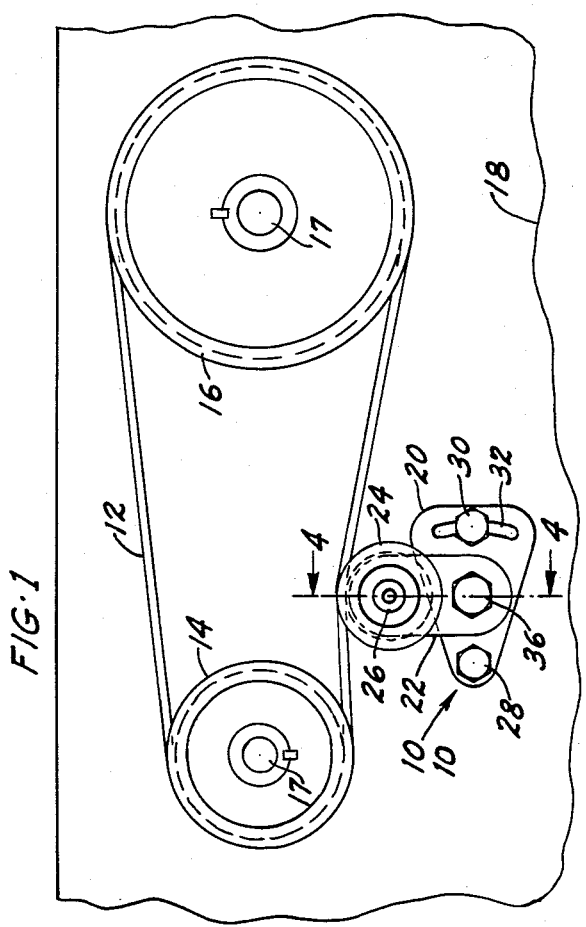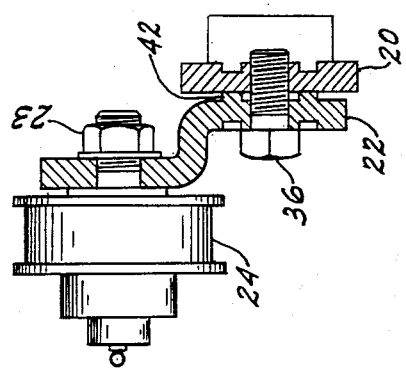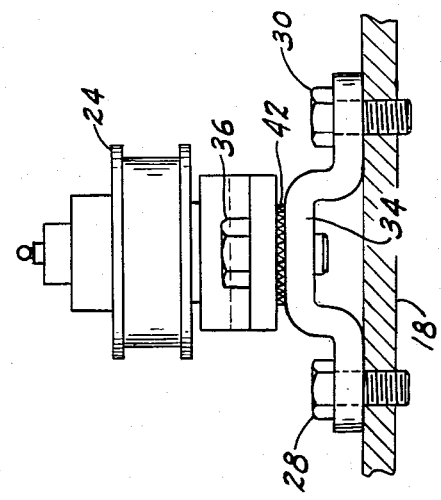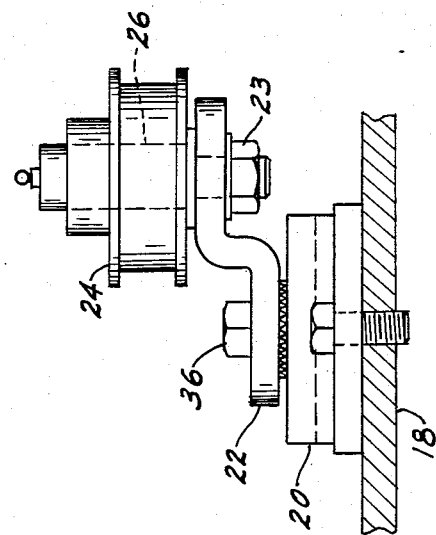

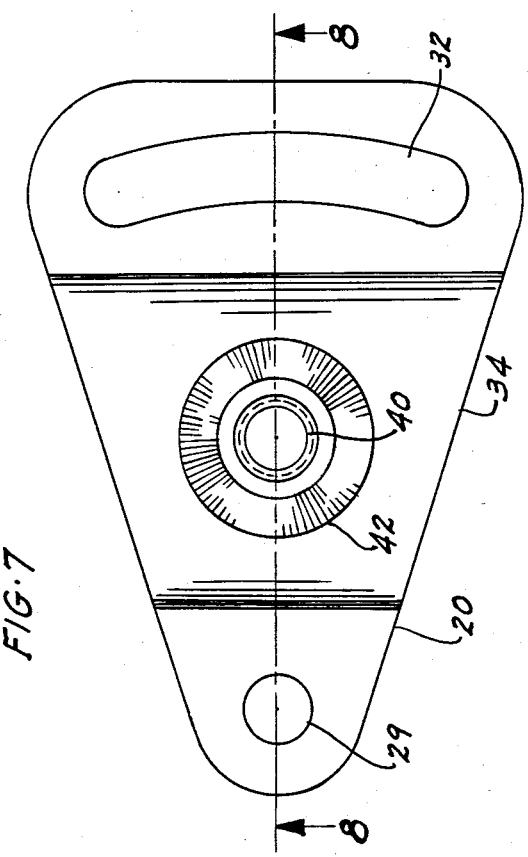
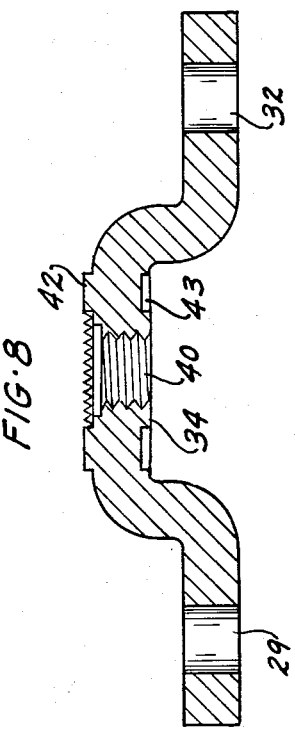
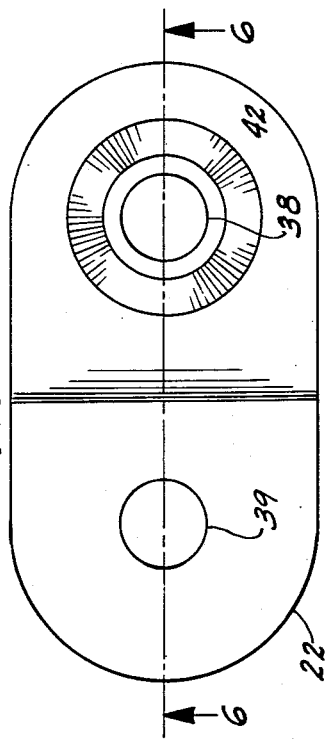
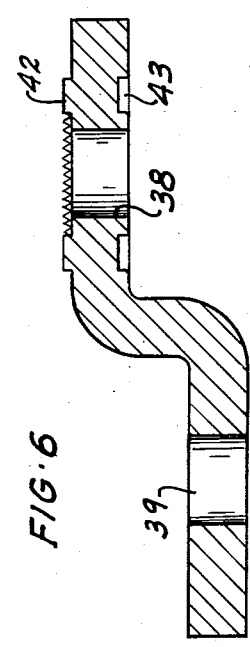
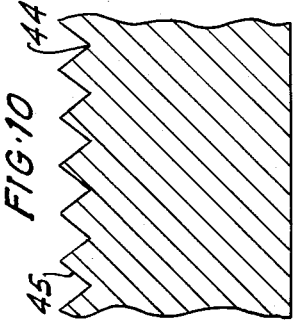
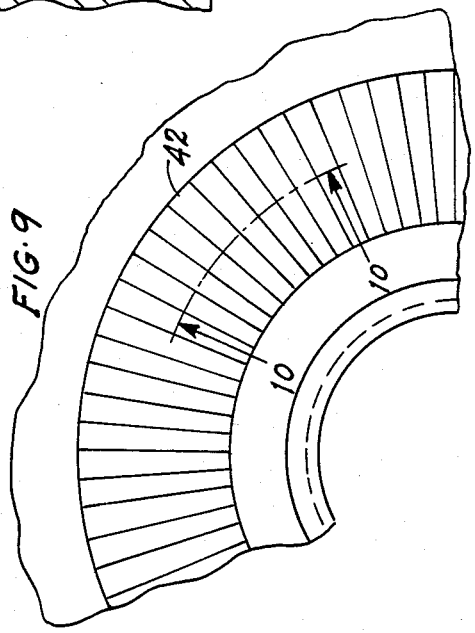

METHOD OF CONSTRUCTING A DRIVE TENSIONING DEVICE

This invention relates generally to adjustable tensioning devices for drive belts or chains and more particularly to an economical method of constructing such devices which employ meshing serrations to provide locked incremental angular adjustments.

BACKGROUND OF THE INVENTION

In some prior constructions tensioning devices of this kind adapted to heavy duty use and having an arm mounted for angular adjustment on a base with meshing serrations on the meeting surfaces of these members to provide locked incremental angular adjustment of the arm were formed as castings of malleable iron including integral annular pads having alternate teeth and grooves forming the serrations. When so casting the serrated pads integral with the base and arm the size and spacing of the teeth which it was practical to form by this method was limited and therefore the increments of annular adjustment of the arm on the base was limited. Moreover, the serrations thus formed by casting of malleable iron invariably required costly machining of the serrations to insure suitable meshing.

In other prior constructions of these devices adapted to heavy duty use the base and arm were formed of rolled steel stock and machined serrated rings of similar metal were welded in proper position on the meeting surfaces of the base and arm. This method of construction was again costly inasmuch as the serrated rings were machined and then accurately welded in position on the base and arm.

Applicant has found that it is practical and considerably more economical than in prior methods of constructing devices of this kind for heavy duty use to construct the base and arm of rolled steel stock and to form annular pads on the meeting surfaces of the base and arm by indenting and cold flowing metal from the opposite sides of these members and in forming serrations in these pads by coining. By this method of forming the serrated annular pads the metal is cold worked providing stronger teeth which may be reduced in size to provide more teeth and therefore a greater number of locked angular adjustments of the arm on the base for a given diameter annular pad.

OBJECTS OF THE INVENTION

An object of the invention is to provide a particularly economical method of constructing an adjustable drive tensioning device having meshing serrations providing locked incremental adjustments.

A further object is to provide an economical method of forming an annular serrated pad on one surface of a member constructed of rolled steel stock having a thickness greater than the height of the pad.

Other objects and advantages will appear when reading the following description in connection with the accompanying drawings.

IN THE DRAWINGS

FIG. 1 is a front elevational view of a double adjustable drive tensioning device constructed in accordance with the present invention shown mounted on a support plate and engaging a drive belt;

FIGS. 2 and 3 are enlarged side elevational views of the adjustable tensioning device shown in FIG. 1;

FIG. 4 is an enlarged partially cross-sectionalized view of the drive tensioning device and is taken along line 4—4 of FIG. 1;

FIG. 5 is a plan view of the arm;

FIG. 6 is a cross-sectional view of the arm taken along line 6—6 of FIG. 5;

FIG. 7 is a plan view of the base;

FIG. 8 is a cross-sectional view of the base taken along line 8—8 of FIG. 7;

FIG. 9 is an enlarged fragmentary plan view of a serrated annular pad; and

FIG. 10 is a still further enlarged fragmentary cross-sectional view taken along line 10—10 of FIG. 9.

DESCRIPTION

Referring to FIG. 1, the adjustable drive tensioning device generally indicated at 10 is shown engaging and tensioning a drive belt 12 which belt is trained over a pair of spaced pulleys 14 and 16 mounted on shafts 17 journalled in a support plate 18. The tensioning device 10 comprises a triangular base member 20, an arm 22 mounted at one end thereof for angular adjustment on the base 20 and having an idler pulley 24 mounted for rotation on a shaft 26 fixed in the other end of arm 22 by a nut 27. The triangular base 20 is attached at its apex end to support plate 18 by a machine screw 28 passing through a clearance hole 29 and at its opposite wide end to support plate 18 by a machine screw 30 which passes through an arcuate slot 32 in the wide end of base 20. The arcuate slot 32 has its center on the axis of screw 28 so that the base 20 may be angularly adjusted about the axis of screw 28 when screws 28 and 30 are loosened.

The one end of arm 22 is connected to an intermediate portion 34 of base 20 by a machine screw 36 which passes through a clearance hole 38 in the one end of arm 22 and is threadedly engaged in a screw threaded bore 40 in the intermediate portion 34 of base 20. The intermediate portion 34 of base 20 is offset from the end portions thereof to provide clearance between the end of screw 36 and the support plate 18 and one end of arm 22 is offset from the other end to provide clearance for nut 23. Projecting from the meeting surfaces of arm 22 and base 20 and concentric with the clearance hole 38 and screw threaded bore 40 respectively are integral annular pads 42 having equally spaced radially extending grooves and teeth 44 and 45 forming interlocking serrations.

The base and arm are constructed of a metal having sufficient ductility for the purpose such as rolled steel, brass or an aluminum alloy. The projecting serrated annular pads 42 are formed on the meeting surfaces of the base and arm by forming annular indentations in the opposite sides of these members at 43 and cold flowing the metal required to form annular pads on the meeting sides and in simultaneously coining radially extending grooves and teeth therein to form serrations by opposing elements of a die set in a press. While complete teeth 45 having straight sides meeting at an acute angle are shown extending from the minor to major diameters of the annuluses in FIGS. 8 and 9 it will be understood that the apexes of teeth 45 may be cut off or flattened progressively from the minor to major diameters of the annuluses as would result when the angle of the sides of the coining tool teeth are constant throughout their radial extent.

Tests have indicated that the teeth of serrations formed by this method, wherein the metal is cold worked, are stronger than when cast of or machined from similar metal. The contours of the base and arm are blanked, offsets therein formed and clearance holes 29, 38 and 39 and arcuate slot 32 punched therein in a press so that the base and arm, with the exception of tapped hole 40 in the base 20 are completed in a press. The depth of the grooves 44 of the serrations is considerably less than the thickness of the base 20 and arm 22.

By way of example, the base 22 and arm 20 of a drive tensioning device as disclosed were constructed by the described method of ⅜ of an inch thick rolled steel stock with meshing serrated annuluses on their meeting surfaces of ¾ of an inch minor and 1¼ inches major diameters and having 40 teeth of less than 1/16 of an inch in height and provided positively locked adjustment when subjected to a torque in excess of that causing breakdown of prior constructions having cast or machined meshing serrated annuluses of equivalent diameters.

We claim:

1. The method of providing a locked incremental angularly adjustable connection of two flat metal members having meeting sides which consists in; depressing separately an annular indentation in that side of each member opposite its meeting side to form annular pads having end faces projecting from the meeting sides thereof, coining radial serrations in the end faces of said annular pads, then meshing the serrations thus formed on the end faces of the pads of said members, and in detachably connecting said meshed members by a bolt passing through apertures in said members central of said annular pads.

* * * * *